United States Patent [19]
Altemir

[11] Patent Number: 5,946,795
[45] Date of Patent: Sep. 7, 1999

[54] METHOD OF MANUFACTURING A MICROMECHANICAL OSCILLATING MASS BALANCE

[75] Inventor: David A. Altemir, Houston, Tex.

[73] Assignee: The United States of America as represented by the Administrator of the National Aeronautics and Space Administration, Washington, D.C.

[21] Appl. No.: 08/910,537

[22] Filed: Jul. 24, 1997

Related U.S. Application Data

[62] Division of application No. 08/587,762, Dec. 12, 1995, Pat. No. 5,684,276.

[51] Int. Cl.⁶ .................................................. H01F 7/06
[52] U.S. Cl. ................................... 29/602.1; 177/210 FP
[58] Field of Search .................... 29/602.1; 177/210 FP, 177/50; 73/24.01, 24.06, 31.05, 31.06, 61.49, 64.53

[56] References Cited

U.S. PATENT DOCUMENTS

4,294,105  10/1981  Kelly ............................................. 73/28

Primary Examiner—Lee W. Young
Assistant Examiner—David Caputo
Attorney, Agent, or Firm—James M. Cate

[57] ABSTRACT

A micromechanical oscillating mass balance and method adapted for measuring minute quantities of material deposited at a selected location, such as during a vapor deposition process. The invention comprises a vibratory composite beam which includes a dielectric layer sandwiched between two conductive layers. The beam is positioned in a magnetic field. An alternating current passes through one conductive layers, the beam oscillates, inducing an output current in the second conductive layer, which is analyzed to determine the resonant frequency of the beam. As material is deposited on the beam, the mass of the beam increases and the resonant frequency of the beam shifts, and the mass added is determined.

6 Claims, 6 Drawing Sheets

METHOD OF MANUFACTURING A MICROMECHANICAL OSCILLATING MASS BALANCE

This is a division, of application Ser. No. 08/587,762, filed Dec. 12, 1995 now U.S. Pat. No. 5,684,276.

ORIGIN OF THE INVENTION

The invention described herein was made by employee(s) of the United States Government and may be manufactured and used by or for the Government of the United States of America for governmental purposes without the payment of any royalties thereon or therefor.

BACKGROUND OF THE INVENTION

The present invention relates to mass measuring processes and apparatus, and more particularly, to mass sensing devices capable of real-time measurement of the minute quantities of material deposited on the surface of a test sample prior to deposition forming of semiconductor chips or the like, by means of signals conducted to sensing and evaluation circuitry positioned external to the deposition chamber. Sensor arrays built up from many such mass sensing devices permit real-time sensing of deposition patterns over the surface of such an array.

Over the past four decades, techniques have been developed for measuring small masses by depositing the mass on the surface of a quartz crystal oscillator and noting the resulting decrease in the frequency of the crystal. These devices are commonly referred to as quartz crystal microbalances ("QCM"s) and comprise a thin quartz crystal sandwiched between two metal electrodes. When an alternating electric field is applied across the piezoelectric quartz crystal, a shear-induced acoustic wave is generated whose frequency is sensitive to changes in mass. This enables small masses to be quantified with a sensitivity on the order of $10^{-9}$ grams/cm$^2$ per Hertz frequency shift.

Typical QCM elements have areas in the neighborhood of 1 cm$^2$ with excitation frequencies on the order of $10^7$ Hz. However, QCM instrument packages are commercially available that are as small as a person's thumb. Although QCMs are capable of measuring extremely small quantities of matter and are very portable, some disadvantages of this existing technology include its susceptibility to thermal gradient and mass gradient-induced errors. Therefore, corrections must be applied to QCM data whenever the devices are unevenly heated or mass is non-uniformly deposited on active QCM surfaces.

Other kinds of devices currently exist that are also capable of measuring small masses. One of these devices has been developed more recently and is known as a tapered element oscillating microbalance ("TEOM"). Although this instrument also interprets a mass change as a function of a frequency shift, important differences exist between QCMs and TEOMs. Whereas QCMs measure small amounts of matter deposited on a surface, the TEOM is primarily intended to measure the concentration of solid particles in a sampled gas stream. Also, in contrast with QCM which relies on a piezoelectric effect to generate its vibratory motion, the TEOM is driven electromagnetically. In the basic TEOM embodiment, a gas is pumped through the end of the hollow tapered element at a known flow rate. Solid particles are then removed from the gas flow by a filter and the subsequent mass change results in a frequency shift.

Like QCMs, TEOMs are not without problems. The oscillation of the tapered element in TEOMs is controlled by applying an alternating voltage bias to the body of the tapered element. The rate at which this voltage alternates, and hence the rate at which the TEOM vibrates, is controlled by a feedback circuit employing an LED/phototransistor combination that produces an AC voltage based on the motion of the tapered element. Therefore the signal produced by the phototransistor serves as a drive voltage which self-adjusts to alternate at the resonant frequency of the tapered element. The frequency of this TEOM signal can be directly related to the mass accumulated at the free end of the device.

The sensitivity of commercially available TEOMs is on the order of $10^{-6}$ grams. However specialized TEOMs, such as those specially developed for NASA/Goddard Space Flight Center, have been operated with resolutions on the order of $10^{-12}$ grams under extremely well controlled conditions.

With regard to the fabrication of micromechanical devices, micromachining has been extensively practiced in the electronics industry using electron, ion, and X-ray bombardment. These techniques have been used in the fabrication of structures as small as a fraction of a micron long with diameters below 100 angstroms. Tiny vibrating bridges have also been constructed as a tool for fundamental research. These bridges however, do not oscillate under the influence of a controlled electric field nor do they generate an electrical signal.

U.S. Pat. No. 3,492,858 to Heflinger, et al. discloses a microbalance apparatus with a vibratory Elinvar reed located over a vibratory main frame, which is caused to vibrate by a signal applied to a bimorph crystal. A small pickoff coil senses the frequency of vibration of the Elinvar reed and feeds it back through a closed loop circuit causing the driver, frame, and reed to vibrate at the resonant frequency of the reed. Placement of a small mass or particle on the end of the reed alters the reed's resonant frequency according to the mass of the particle, permitting the mass of the particle to be determined. In the Heflinger system, the vibration of the reed is caused by a crystal driver which is not directly coupled to the frame. The Heflinger system however, is not suitable for integration to a silicon chip carrier, and is susceptible to thermal errors.

U.S. Pat. No. 3,926,271, to Pataschnick, discloses a microbalance which implements a thin walled quartz tube that has a tapered vibrating section. The vibrating section is preferably a hollow tube, but may alternatively comprise a solid rod. The tube is anchored at one end to a base, and at the distal end it is free to oscillate. The tapered element is driven by alternating fields generated by reaction between alternating currents passed through leads and a field generated by the potential between two electrodes. The vibrating section preferentially vibrates at a given resonant frequency. However, deposits on a substrate mounted on the distal end of the reed change the resonant frequency. This change in frequency is measured by electrical feedback as the frequency of the applied voltage is timed, or by a motion detector utilizing an optical transducer and light source. The Pataschnick microbalance is of relatively large size and is quite fragile, and would be unacceptable for applications with high inertial loads.

U.S. Pat. No. 4,429,574, to Barry discloses a mass measuring system which determines the mass of relatively larger objects by utilizing a vibrator for inducing vibration within a test object. A probe is connected to piezoelectric transducers for sensing changes in the resonant frequency of vibration and determining differences in mass of the object by evaluating such changes. The Barry mass measuring system is likewise inapplicable to high inertial loads and integration to a silicon chip carrier, due to its size and fragility. Further, the analysis of the Barry system performance requires solution of a series of relatively complex mathematical equations.

Thus, previously available microbalances all suffer from one or more disadvantages, including high cost, poor sensitivity, susceptibility to thermal errors, and lack of durability. The present invention overcomes the deficiencies of the prior art.

SUMMARY OF THE INVENTION

Accordingly, there is provided herein a micromechanical oscillating mass balance and method which are particularly adapted to be used for measuring minute quantities of material deposited at a selected location, such as on a workpiece within an evacuated chamber during a vapor deposition process. The micromechanical oscillating mass balance of the present invention comprises a vibratory composite beam which includes a dielectric layer sandwiched between two conductive layers. The vibratory composite beam is positioned in a magnetic field. An alternating current is passed through one of the conductive layers, whereby the alternating current interacts with the magnetic field and creates a force which deflects and vibrates the beam. As material is deposited on the beam, the mass of the beam increases and the resonant frequency of the beam shifts. An output current signal is induced in the second conductive layer as the beam vibrates in the magnetic field. The shift of the resonant frequency of the beam results in a shift in the frequency of this output signal. The output signal is then analyzed to determine the mass of the deposited material. An array of such multiple oscillating mass balance sensors may be formed on a substrate, such as a silicon semiconductor chip, and a magnetic field affecting all of the sensors on the chip is then provided by a magnet positioned adjacent the chip. Circuits connected to the sensors may each include respective input and output leads. Further, common positive and negative input bus strips may be used to connect rows of the sensors. The second conductive element of each sensor connects to respective positive and negative output leads, enabling the output signals from each of the sensors to be fed to processing circuits. The output signals are evaluated to determine the amount of deposition at each of the multiple locations over the surface of the chip, or such other area of interest on or around which the sensors are mounted. An evaluation of the pattern of deposition throughout the surface of interest may then be made.

The small size of a micromechanical oscillating mass balance affords several distinct advantages over previously existing technologies. In addition to excellent portability and applicability to virtually any environment and location, temperature gradients are substantially minimized by the small physical dimensions (microns) and low mass of the sensor element. This allows efficient control of the temperature of the sensing element. This temperature control can be accomplished easily by mounting the instrument directly on a solid state Peltier device. Such an approach for the temperature control of other mass measuring devices is not feasible due to their generally complicated shapes and relatively large sizes. The small mass of the sensor element of the present invention also makes it able to survive large inertial loads while other measurement systems are relatively fragile.

Another advantage of the present invention is the reduced cost associated with both design simplicity and the low excitation frequency of the active element. Prior devices such as QCMs, which operate in the megahertz range, require more expensive instrumentation than the mass balance of the present invention, which vibrates in the kilohertz range. The vibrational mode of the present invention is also inherently simpler than the relatively complex transverse vibrational mode of prior devices such as QCMs. This is beneficial since it facilitates a relatively straightforward theoretical analysis of the performance of the invention.

In summary, the potential benefits of the proposed invention are low cost, high sensitivity and ruggedness, and low susceptibility to thermal errors relative to previously available microbalances.

BRIEF DESCRIPTION OF THE DRAWINGS

For a more detailed description of the preferred embodiments of the invention, reference will now be made to the accompanying drawings, wherein.

DESCRIPTION OF THE PREFERRED EMBODIMENTS

I. Introduction

The micromechanical oscillating mass balance is an instrument to measure small quantities of material, and having a measurement resolution on the order of 0.01 micrograms ($10^{-8}$ grams). This device is applicable to a wide range of uses involving the mass transfer of minute quantities of material, including the measurement of deposited material upon surfaces in high and ultra high vacuum environments (e.g. physical vapor deposition chambers) and the experimental determination of surface chemical reaction rates.

II. Micromechanical Oscillating Mass Balance Sensor Element

Figure 1:
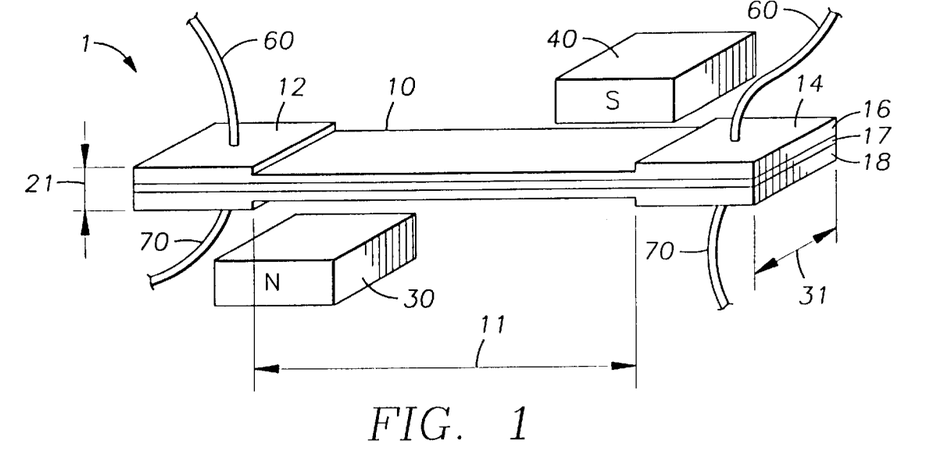
FIG. 1 is a greatly expanded isometric view of a preferred embodiment of the micromechanical oscillating mass balance sensor element in accordance with the present invention.

Referring now to FIG. 1, a preferred embodiment of the sensor element of the present invention is illustrated. The sensor element 1 comprises a tiny composite beam 10 with both ends 12, 14 rigidly fixed.

The beam 10 is preferably comprised of three layers, namely a dielectric middle layer 17, sandwiched between two conductive layers 16, and 18. An alternating current (hereinafter "AC drive current") is passed through conductive layer 16, and a magnetic field is applied around beam 10 by, for example, a set of permanent magnets 30 and 40 disposed in the vicinity of beam 10. As will be obvious to one skilled in the art, other means of providing such a magnetic field may be employed without departing from the scope of the present invention.

Figure 2:
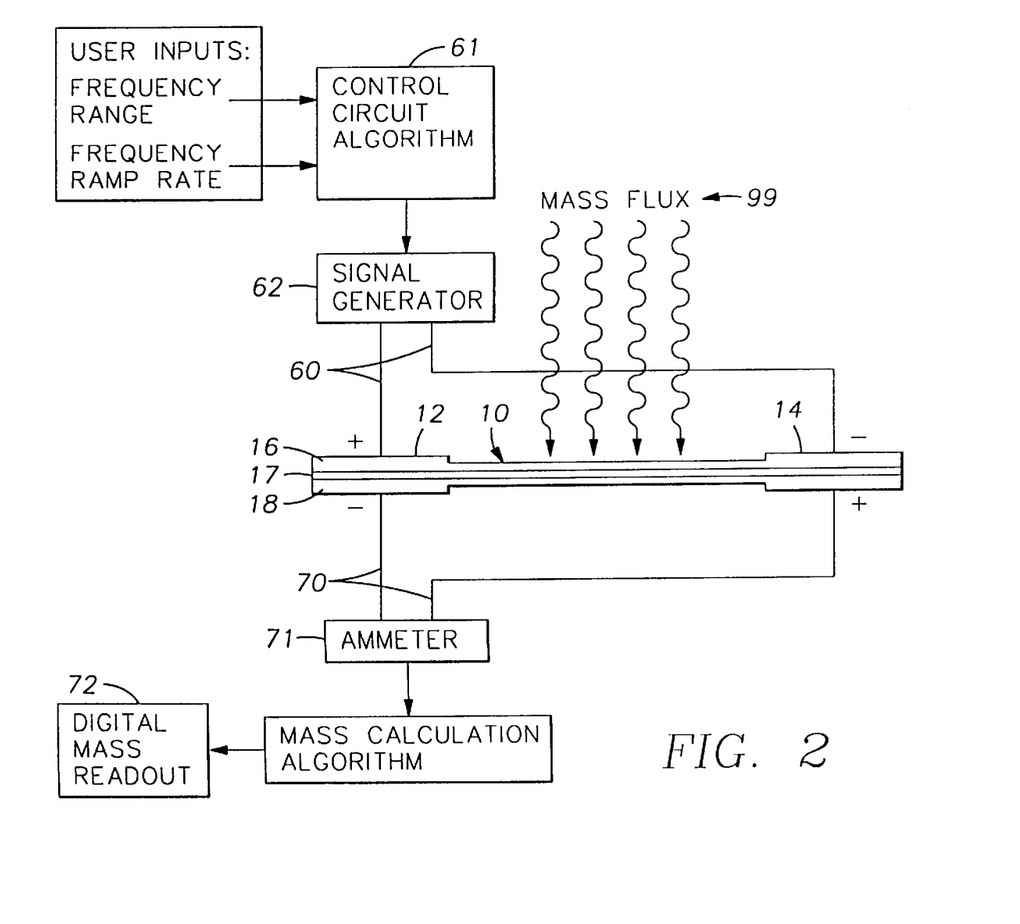
FIG. 2 is a simplified schematic of a micromechanical oscillating mass balance system in accordance with the present invention.

Referring now to FIGS. 1 and 2, AC drive current leads 60 are electrically coupled to the ends 12, 14 of conductive layer 16, to conduct the AC drive current between sensor element 1 and an input circuit. The input circuit preferably includes a control circuit algorithm 61 and signal conditioning circuitry such as signal generator 62, as is well known in the art. Output current leads 70 are similarly attached to the ends 12, 14 of conductive layer 18 to conduct the output current signal between sensor element 1 and an output circuit, which preferably includes signal analysis circuitry such as ammeter 71 and readout 72, also well known in the art.

Figure 3:
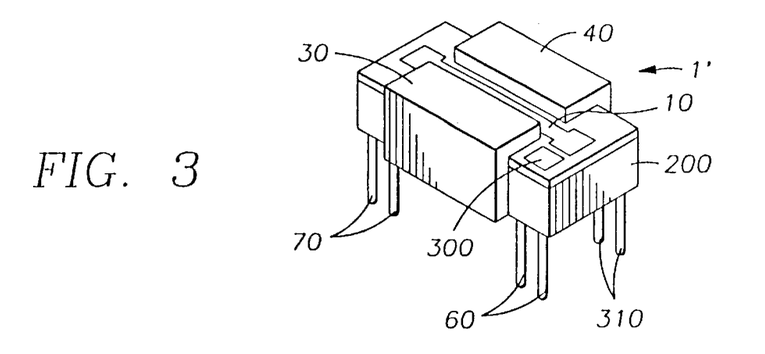
FIG. 3 is a simplified isometric view of a preferred embodiment of the present invention in which the micromechanical oscillating mass balance sensor element is integrated with a semiconductor chip.
Figure 4:
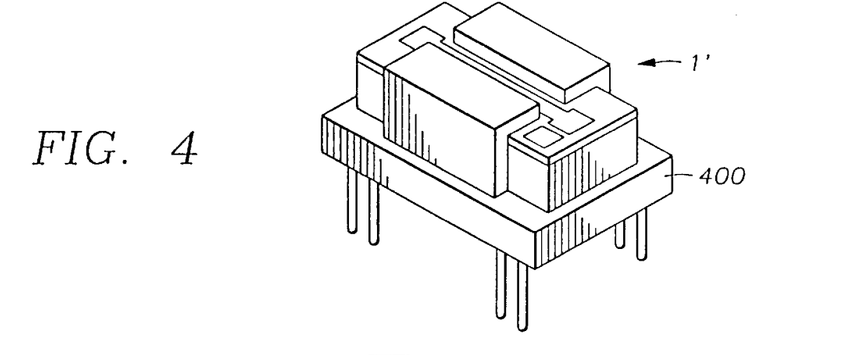
FIG. 4 is a simplified isometric view of another preferred embodiment of the present invention in which the micromechanical oscillating mass balance sensor element is integrated with a semiconductor chip and a Peltier device.

Referring now to FIGS. 3 and 4, other preferred embodiments of the micromechanical oscillating mass balance of the present invention are illustrated. In these embodiments, the sensor element 1' is integrated with a silicon substrate such as chip 200, and permanent field magnets 30, 40. The embodiment illustrated in FIG. 3 also preferably incorporates a temperature sensor 300, and temperature sensor signal connections 310 electrically coupled to temperature sensor 300. Temperature sensor 300 preferably comprises a thermistor, although other temperature sensors may be used without departing from the scope of present invention. The temperature sensor 300 provides an indication of the temperature of the micromechanical oscillating mass balance. This temperature indication is preferably used as an input to a control scheme, which may be a conventional control circuit (not shown), and is thus used by the control circuit to maintain a constant temperature at the sensor element. Referring now to FIG. 4, a constant temperature at the sensor element is obtained by a constant temperature source, preferably a chip carrier with built-in Peltier device 400. The temperature indication may also be used to make thermal corrections to the output signal current from the micromechanical oscillating mass balance.

Figures 5, 5A:
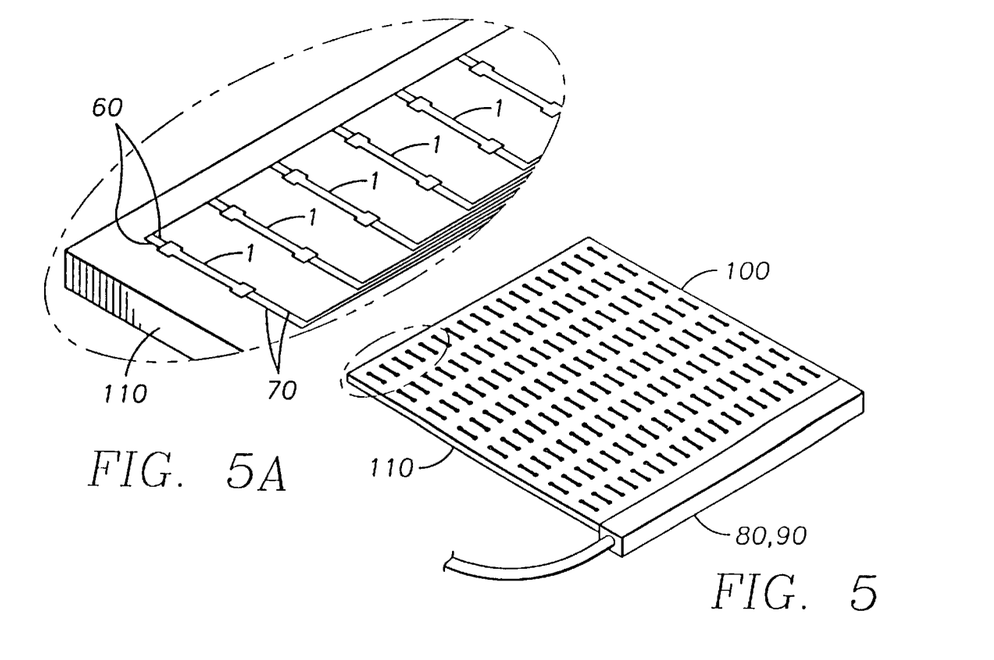
FIG. 5 is a schematic of a micromechanical oscillating mass balance sensor element array, which includes a plurality of sensor elements in accordance with the present invention.
Figure 6:
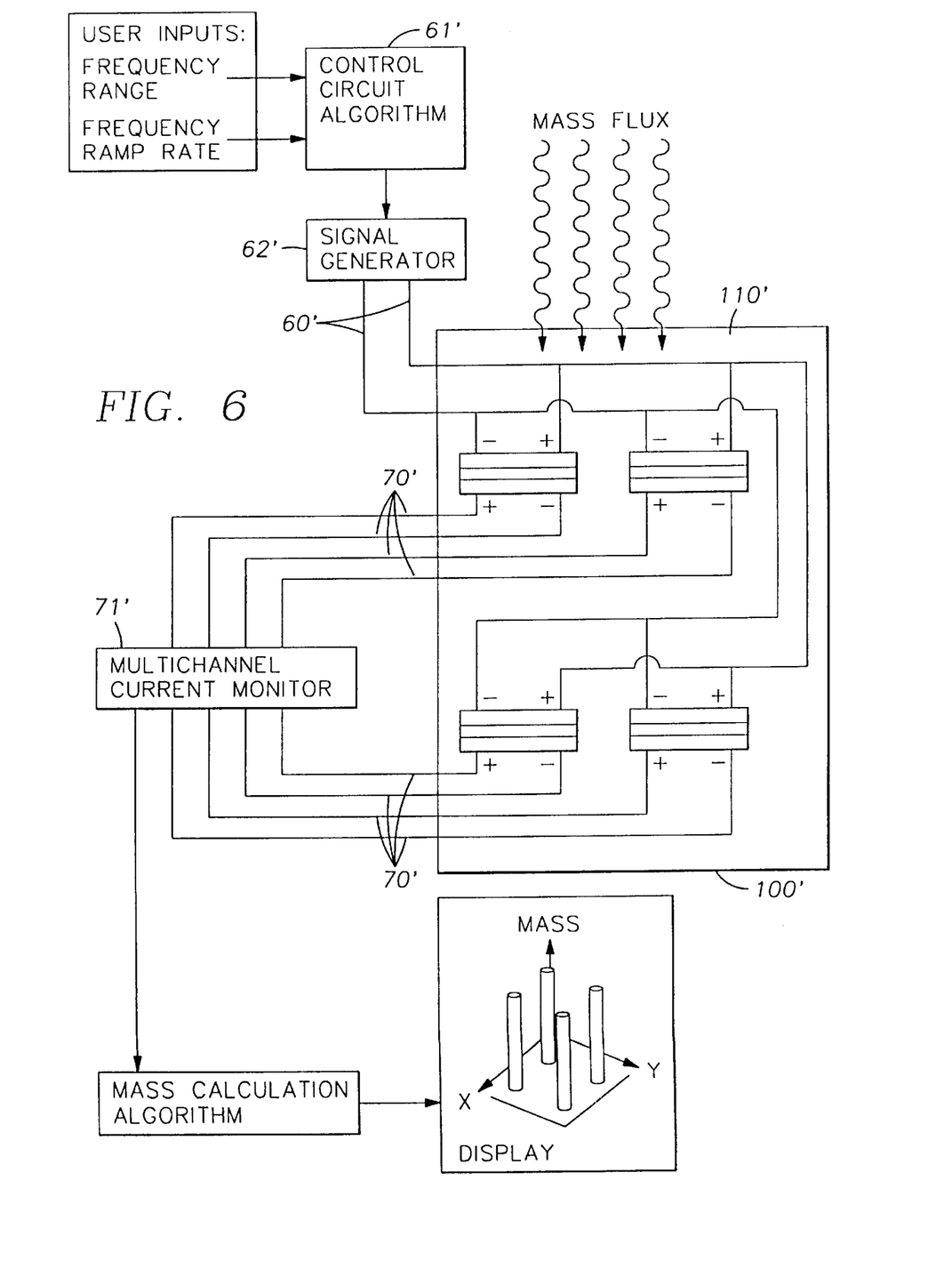
FIG. 6 is a simplified schematic of a micromechanical oscillating mass balance sensor array system in accordance with the present invention.

Referring now to FIGS. 1, 5, and 6, a plurality of sensor elements 1 as shown in FIG. 1 may be utilized in a sensor array 100, as illustrated in FIG. 5. Sensor array 100 may comprise any suitable substrate such as a silicon semiconductor chip 110. In such an embodiment, a magnetic field affecting all of the sensor elements 1 on chip 110 is provided by a magnet (not shown) positioned adjacent to chip 110. Circuits for the AC drive current and output current signal preferably connect to all sensor elements 1 on sensor array 100 via AC drive current leads 60 and output current signal leads 70, respectively, and common positive and negative bus strips 80 and 90. Common input bus strips 80 preferably are used to connect the first conductive layer 16 of the rows of sensor elements 1 in an array 100 to AC drive current. The second conductive layer 18 of each sensor element 1 of a row similarly connects to positive and negative output bus strips 90, via output current signal leads. As will be described further, the output signals 50 from each of the sensor elements 1 in array 100 couples to output signal processing circuit(s).

Referring now to FIG. 6, there is shown an exemplary sensor array comprising four sensor elements in a two-by-two sensor array 100' on a common substrate chip 110', and input and output signal processing circuitry as is well known in the art. AC drive current leads 60' conduct the AC drive current between an input circuit and sensor array 100'. The input circuitry for the exemplary embodiment of FIG. 6 includes control circuit algorithm 61' and signal generator 62'. Four pairs of current signal leads 70' are used in this embodiment. The output circuitry includes multichannel current monitor 71'.

In both the embodiment illustrated in FIG. 5 and the embodiment illustrated in FIG. 6, the output signals are evaluated in accordance with the invention described herein to determine the amount of deposition at multiple locations over a surface of interest. Evaluation of the deposition pattern over the surface of array 100 is thus used to determine the amount of deposition over chip 110. Similarly, the deposition pattern over the surface of array 100' allows determination of the amount of deposition over chip 110'.

III. Theory of Operation of Sensor Element

Referring again to FIGS. 1 and 2, the AC drive current 20 interacts with the magnetic field created by magnets 30, 40, and a force is created which serves to deflect beam 10. This force is described, in vector notation, by:

$$\overline{F} = (\overline{i}_d \times \overline{B})l \quad (1)$$

where $\overline{i}_d$ is the AC drive current 20, $\overline{B}$ is the magnetic flux density due to magnets 30, 40, and $\ell$ is the length 11 of beam 10. Since the AC drive current is an alternating signal, the direction of the force $\overline{F}$ also is alternating and, therefore, beam 10 will oscillate with a frequency that can be controlled by adjusting the frequency of AC drive current. In this way, conductive layer 16 essentially acts in analogous fashion to a singly wound rotor of an electric motor.

Because the entire beam 10 oscillates, the second conductive layer 18 also moves in the presence of the magnetic field created by magnets 30, 40, which induces an electric output current in conductive layer 18. The amplitude and frequency of output current are preferably used to characterize the oscillation of beam 10. Conductive layer 18 therefore functions in analogous fashion to a singly wound rotor of an AC generator.

When material is deposited on and adheres to beam 10 due to a mass flux 99, the resonant frequency of the beam/material assemblage shifts relative to the resonant frequency of beam 10 alone (in a "clean" state). The resulting output current is then preferably used to correlate the frequency shift to the mass of the material added to beam 10. The output current is proportional to v, the velocity of the oscillating beam/material assemblage, according to the relation $$i_o = \frac{Blv}{R} \quad (2)$$

where R is the resistance of the output current circuit. Since the velocity of the oscillation of the beam/material assemblage is the derivative of the vibrational amplitude of the oscillating assemblage, $$i_o = \frac{Bl}{R}\frac{dx}{dt} \quad (3)$$

where x is the vibrational amplitude of the oscillating beam 10, or the oscillating beam/material assemblage, and dx/dt is the derivative of the vibrational amplitude with respect to time.

Figure 7:
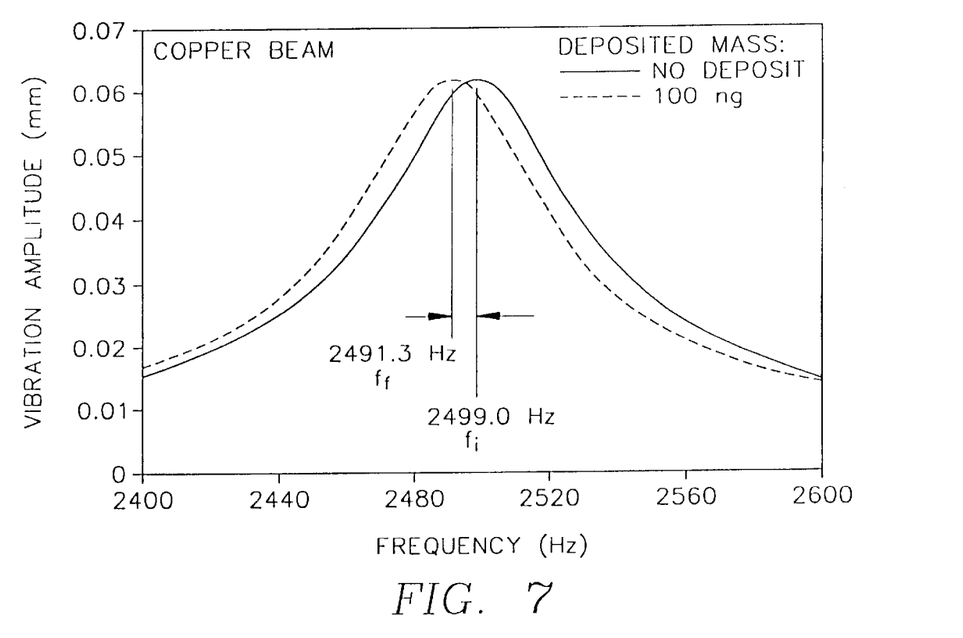
FIG. 7 is a graph of the calculated vibrational amplitude of a composite beam for a preferred embodiment of the micromechanical oscillating mass balance sensor element in accordance with the present invention, plotted over a range of vibrational frequencies.
Figure 8:
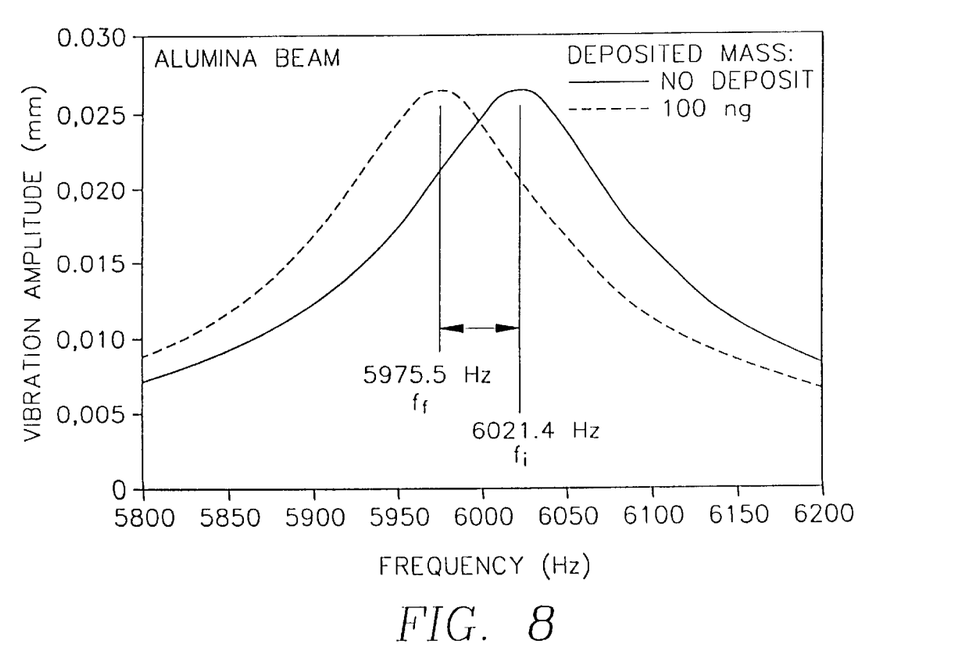
FIG. 8 is a graph of the calculated vibrational amplitude of a composite beam for another preferred embodiment of the micromechanical oscillating mass balance sensor element in accordance with the present invention, plotted over a range of vibrational frequencies.

Referring now to FIGS. 1, 7, and 8, predictions are shown for sensor element vibrational amplitudes based on NASTRAN finite element analyses performed for a beam 10 with a length 11 of 3000 µm, a width 31 of 100 µm, and a thickness 21 of 6 µm. Analyses are shown for sensor element beams comprised of copper and alumina in FIGS. 7 and 8, respectively. The NASTRAN model code used for these analyses is listed in the Appendix. NASTRAN output is summarized by the output curves shown in FIGS. 7 8 and 9. Since copper and alumina differ significantly in their elastic properties, the results shown represent the upper and lower limits on the vibrational amplitude of any copper/alumina composite beam 10 in accordance with the present invention. Many other compositions of beam 10 will be apparent to one reasonably skilled in the art.

Referring still to FIGS. 7 and 8, two important conclusions are apparent. First, the vibrational amplitude of the sensor element beam 10 increases drastically at the fundamental frequency of beam 10. Thus the output current signal will likewise increase at these characteristic frequencies. Second, a detectable frequency shift occurs when sensor element beam 10 experiences even a very small increase in mass due to, for example, deposition of material. This frequency shift is calculated to be approximately 1 Hz for changes in mass of $10^{-8}$ grams. Shifts of this magnitude are easily detectable by conventional signal analysis equipment well known in the art.

Figure 9:
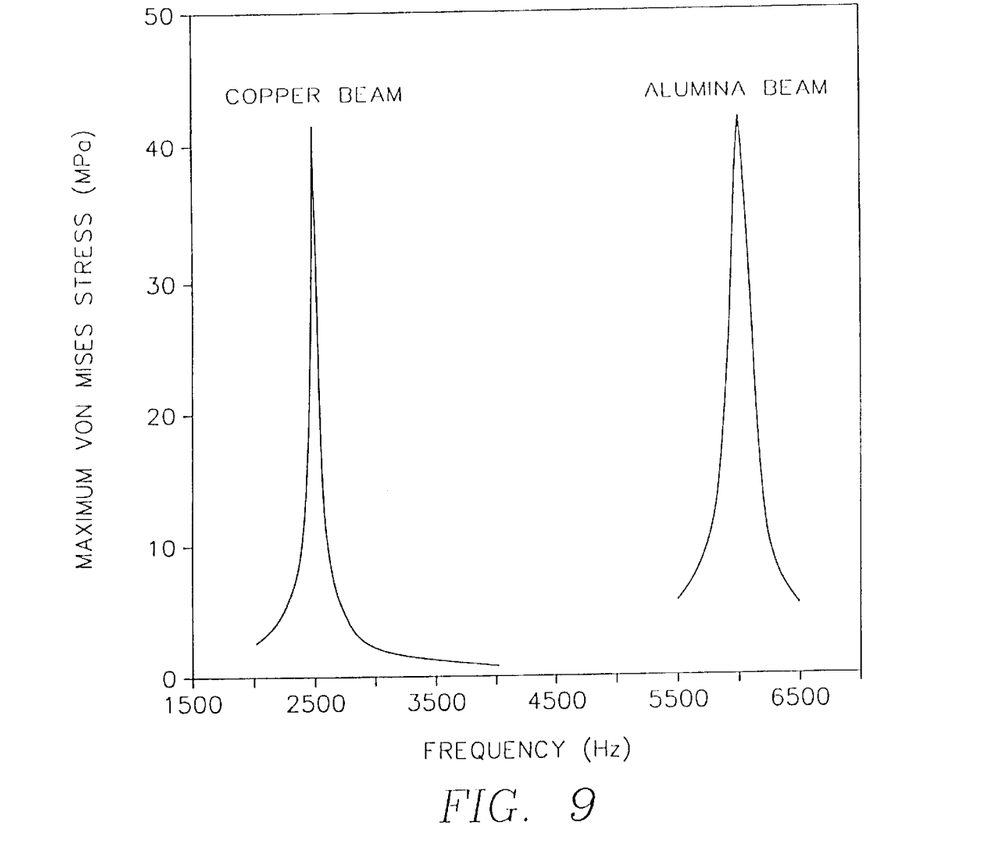
FIG. 9 is a graph of the calculated maximum stress on micromechanical oscillating mass balance sensor element beams constructed of copper and alumina (aluminum dioxide)

An important operational issue of the micromechanical oscillating mass balance of the present invention is the susceptibility of the sensor element to fatigue failure. Referring now to FIG. 9, there are shown the maximum stresses predicted by NASTRAN analyses for the copper and alumina sensor element beams 10 discussed above with reference to FIGS. 7 and 8. The loads for these cases are based on an AC drive current with an amplitude of 1 mA. In the case of a monolithic copper beam, the fatigue strength limits are not exceeded until at least $10^7$ cycles at a beam temperature of 325° C. based on fatigue curves such known in the art. See e.g. A. J. Kennedy, *Processes of Creep and Fatigue in Metals* (1962). Based on an extrapolation of the available data, fatigue should not be a problem near room temperature because the maximum stress level predicted by the finite element analysis is well below the fatigue strength limits. Further, these maximum stresses occur only at the fundamental frequency of the beam 10 and do not occur uniformly throughout the entire frequency range of the sensor element 1. Therefore, a lifetime estimate of $10^7$ cycles is quite conservative since these stresses are experienced during only a small fraction of the operating time of element 1.

Crosstalk between the AC drive current and output current signal is also of concern. However, crosstalk can be alleviated by properly selecting the thickness of the dielectric layer 17. By way of example, alumina ($Al_2O_3$) and silica ($S_iO_2$) layers of proper thickness are both known to satisfy this requirement, and many ceramic materials and polymeric materials should provide acceptable performance. Many other satisfactory materials will be apparent to those skilled in the art.

IV. Fabrication of Sensor Element

The dimensions of sensor element 1 are on the order of microns and, therefore, the fabrication of the device will require use of microscopic manufacturing methods such as are currently practiced in the microelectronics industry. One or more sensor elements 1 may be integrated on the surface of a silicon chip together with supporting electronic circuitry in accordance with the present invention. Although any number of manufacturing sequences may be imagined, by way of example and not limitation, an exemplary proposed fabrication sequence will now be described.

Referring now to FIGS. 10a–10h, the manufacturing sequence preferably begins with a flat non-conductive substrate 200, on which the micromechanical oscillating mass balance is constructed. Substrate 200, in an exemplary embodiment, may be a part of a preassembled silicon chip carrier that has electrical connections already built into it. The substrate is then drilled or machined to form a hole 205 through the substrate. The diameter of hole 205 is chosen to correspond to the desired length of the beam 10 (e.g. reference numeral 11 in FIG. 1). The surface of substrate 200 is then activated by treatment with an atomic beam 220, such as an argon beam, or other non-reactive atomic beam. This treatment modifies the surface of substrate 200 by increasing its surface energy and rendering it an adhesive surface 210.

Figure 10A:
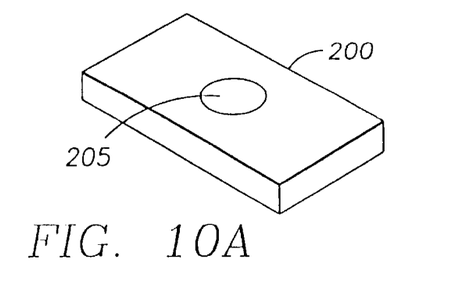
FIGS. 10a–10h are schematic diagrams of a micromechanical oscillating mass balance sensor element in various stages of an exemplary fabrication scheme in accordance with the present invention.
Figures 10B, 10C:
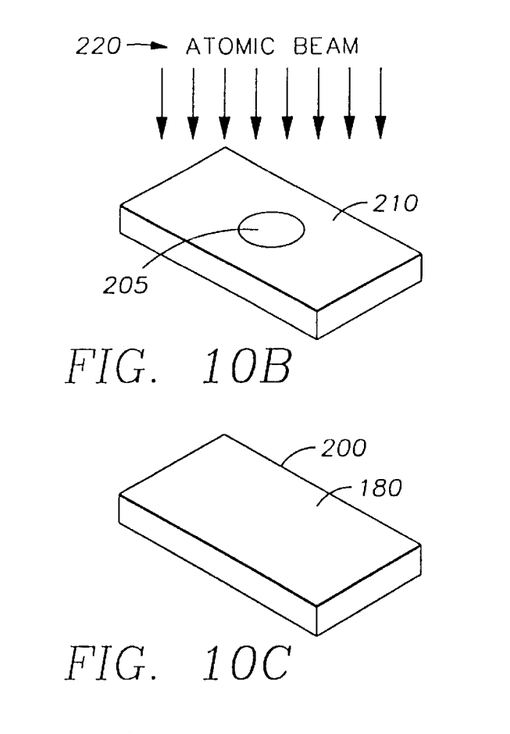
Figure 10D:
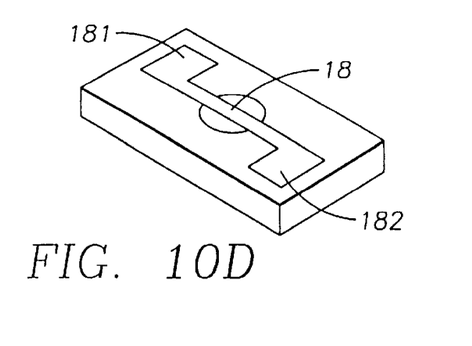

Conductive layer 18 then is created by first applying a conductive metal foil 180 to the adhesive surface 210, as shown in FIG. 10c. The foil 180 adheres to adhesive surface 210 as a result of the aforementioned treatment by atomic beam 220. Although a range of thicknesses for foil 180 is acceptable, a thickness of approximately 3 µm is preferred. The layer of foil 180 is then machined by photolithography, as is known in the art, to remove the foil 180 from part of the surface and leave only the conductive layer 18 of what will become sensor element beam 10 and electrical connections points 181, 182, as shown in FIG. 10d.

Figure 10E:
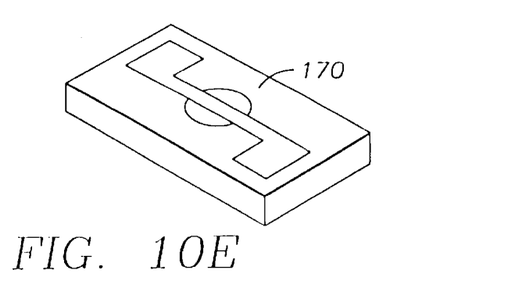
Figure 10F:
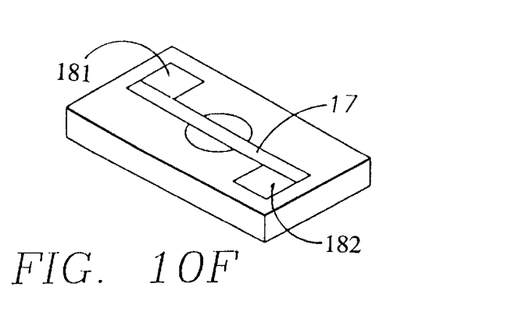

The dielectric layer 17 then is created by vapor-depositing a layer 170 of nonconductive oxide, such as silica or alumina, over the substrate (including conductive layer 18). This oxide layer is then partially removed, (as shown in FIG. 10e) using photolithographic techniques, from part of the surface so that it remains only on what will become sensor element beam 10. The oxide layer is removed from electrical connection points 181, 182 as a result of this process, as shown in FIG. 10f.

Figure 10G:
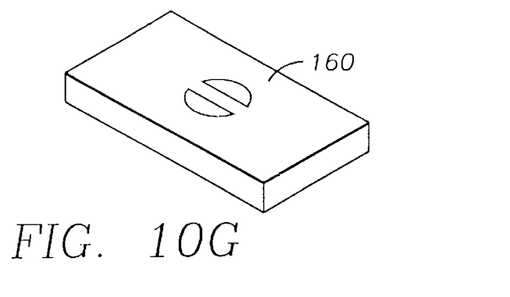
Figure 10H:
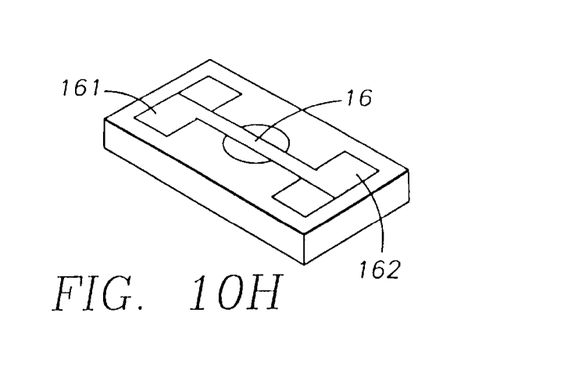
Figure 11:
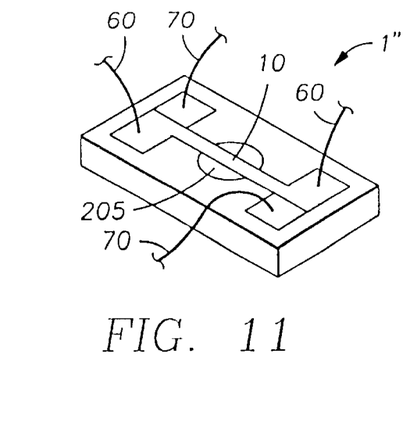
FIG. 11 is a schematic diagram of a micromechanical oscillating mass balance sensor element after fabrication in accordance with an exemplary fabrication scheme of the present invention.
Figure 12:
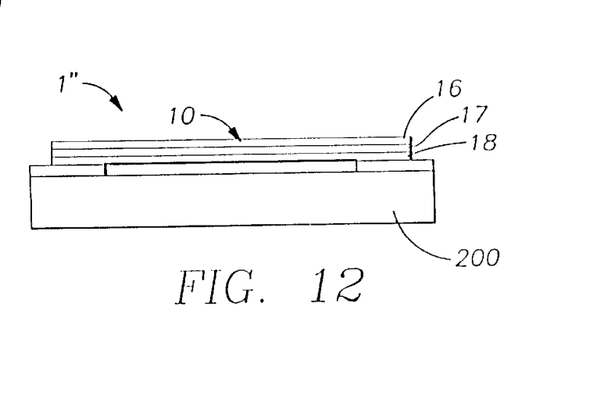
FIG. 12 is a cross section of a micromechanical oscillating mass balance sensor element after fabrication in accordance with an exemplary fabrication scheme of the present invention.

Conductive layer 16 then is created by vapor-depositing a second layer of conductive metal foil 160 over the substrate (including dielectric layer 17), as shown in FIG. 10g. This second layer of foil 160 is then similarly machined via photolithography to leave only the "top" conductive layer 16 of beam 10 and its electrical connection points 161, 162, as shown in FIG. 10h. At this point the element 1" is essentially complete, and leads 60, 70 may be added as shown in FIG. 11. Referring also to FIG. 12, an embodiment of element 1" in accordance with the above-described fabrication scheme is shown in cross-section. In this embodiment, conductive layers 16 and 18 are gold, and dielectric layer 17 is silicon dioxide (silica).

Multiple element arrays such as 100 and 100' described previously with reference to FIGS. 5 and 6, respectively, may of course be fabricated by processing a plurality of substrates 200 simultaneously, or by increasing the size of substrate 200 and fabricating a plurality of sensor elements 1" on the substrate, as is known in conventional semiconductor manufacturing art. Other fabrication sequences may of course be imagined by one skilled in the art without departing from the scope of the present invention.

V. Operation of the Micromechanical Oscillating Mass Balance

The preferred method for obtaining a mass measurement using the micromechanical oscillating mass balance involves the vibration of beam 10 through a predetermined frequency range. Before such a mass measurement can be made, the sensor element 1 must be calibrated. This calibration is accomplished by conducting a frequency sweep of the AC drive current through a predetermined range, which may be chosen to include the expected fundamental frequency (or "resonant frequency") of beam 10. The output current signal is then simultaneously analyzed as discussed herein to determine the fundamental frequency of the beam 10 while it is clean (i.e. devoid of deposited material). The mass m of the clean beam 10 is related to its fundamental frequency f according to:

$$m = k/f \tag{4}$$

where k is a temperature dependent proportionality factor. Since the initial (clean) mass of the beam 10 can be calculated theoretically from a knowledge of its material properties, and the fundamental frequency is measured as discussed above, k can then be determined. This k value is then used to measure any change in mass of beam 10 resulting in a final beam mass $m_f$ due to, for example, deposition of material on beam 10, in terms of a frequency shift according to:

$$\Delta m = m_f - m_i = K\left(\frac{1}{f_f^2} - \frac{1}{f_i^2}\right) \tag{5}$$

where the initial (clean beam) and final (beam plus deposited material) masses are indicated by $m_i$ and $m_f$, respectively, and the initial and final fundamental frequencies are indicated by $f_i$ and $f_f$, respectively. Examples of this frequency shift are illustrated in FIGS. 7 and 8, for copper and alumina beams, respectively.

While preferred embodiments of the invention have been shown and described, modifications thereof can be made by one skilled in the art without departing from the spirit of the invention.

---

NASTRAN Input Deck:
Finite Element Model to Calculate MOMB Frequency Response

---

```
ASSIGN,OUTPUT2='mass.op2',NEW,UNIT=12,UNFORMATTED
$
ID MICROBALANCE DESIGN
SOL30
TIME25
CEND
$
TITLE = Microbalance Design -- UNITS = MODIFIED SI
SUBTITLE = Mechanical Frequency Response
SET 100 = 31
DISPLACEMENT(SORT1,PUNCH,PHASE) = 100
METHOD = 1
DLOAD = 2
FREQUENCY = 3
SDAMPING = 4
SPC= 1
ECHO = NONE
$
BEGIN BULK
CORD2S           2       0 0.00000 0.00000 0.00000 0.00000 0.00000 1000.00+1A    2
+1A           2 1000. 0.00000 0.00000
CORD2C           1       0 0.00000 0.00000 0.00000 0.00000 0.00000 1 000.00+1A   1
+1A           1 1000.00 0.00000 0.00000
GRID             1       0-1.50000 0.00000 5.0E-2              0
GRID             2       0-1.50000 0.00000 -5.0E-2             0
GRID             3       0-1.40000 0.00000 5.0E-2              0
GRID             4       0-1.40000 0.00000 -5.0E-2             0
GRID             5       0-1.30000 0.00000 5.0E-2              0
GRiD             6       0-1.30000 0.00000 -5.0E-2             0
GRID             7       0-1.20000 0.00000 5.0E-2              0
GRID             8       0-1.20000 0.00000 -5.0E-2             0
GRID             9       0-1.10000 0.00000 5.0E-2              0
GAID            10       0-1.10000 0.00000 -5.0E-2             0
GRID            11       0-1.00000 0.00000 5.0E-2              0
GRID            12       0-1.00000 0.00000 -5.0E-2             0
GRID            13       0-0.90000 0.00000 5.0E-2              0
GRID            14       0-0.90000 0.00000 -5.0E-2             0
GRID            15       0-0.80000 0.00000 5.0E-2              0
GRID            16       0-0.80000 0.00000 -5.0E-2             0
GRID            17       0-0.70000 0.00000 5.0E-2              0
GRID            18       0-0.70000 0.00000 -5.0E-2             0
GRID            19       0-0.60000 0.00000 5.0E-2              0
GRID            20       0-0.60000 0.00000 -5.0E-2             0
GRID            21       0-0.50000 0.00000 5.0E-2              0
GRID            22       0-0.50000 0.00000 -5.0E-2             0
```

-continued

NASTRAN Input Deck:
Finite Element Model to Calculate MOMB Frequency Response

| | | | | | | |
|---|---|---|---|---|---|---|
| GRID | 23 | 0 | -0.40000 | 0.00000 | 5.00E-2 | 0 |
| GRID | 24 | 0 | -0.40000 | 0.00000 | -5.0E-2 | 0 |
| GRID | 25 | 0 | -0.30000 | 0.00000 | 5.00E-2 | 0 |
| GRID | 26 | 0 | -0.30000 | 0.00000 | -5.0E-2 | 0 |
| GRID | 27 | 0 | -0.20000 | 0.00000 | 5.00E-2 | 0 |
| GRID | 28 | 0 | -0.20000 | 0.00000 | -5.0E-2 | 0 |
| GRID | 29 | 0 | -0.10000 | 0.00000 | 5.00E-2 | 0 |
| GRID | 30 | 0 | -0.10000 | 0.00000 | -5.0E-2 | 0 |
| GRID | 31 | 0 | 3.49E-7 | 0.00000 | 5.00E-2 | 0 |
| GRID | 32 | 0 | 3.49E-7 | 0.00000 | -5.0E-2 | 0 |
| GRID | 33 | 0 | 0.10000 | 0.00000 | 5.00E-2 | 0 |
| GRID | 34 | 0 | 0.10000 | 0.00000 | -5.0E-2 | 0 |
| GRID | 35 | 0 | 0.20000 | 0.00000 | 5.00E-2 | 0 |
| GRID | 36 | 0 | 0.20000 | 0.00000 | -5.0E-2 | 0 |
| GRID | 37 | 0 | 0.30000 | 0.00000 | 5.00E-2 | 0 |
| GRID | 38 | 0 | 0.30000 | 0.00000 | -5.0E-2 | 0 |
| GRID | 39 | 0 | 0.40000 | 0.00000 | 5.00E-2 | 0 |
| GRID | 40 | 0 | 0.40000 | 0.00000 | -5.0E-2 | 0 |
| GRID | 41 | 0 | 0.50000 | 0.00000 | 5.00E-2 | 0 |
| GRID | 42 | 0 | 0.50000 | 0.00000 | -5.0E-2 | 0 |
| GRID | 43 | 0 | 0.60000 | 0.00000 | 5.00E-2 | 0 |
| GRID | 44 | 0 | 0.60000 | 0.00000 | -5.0E-2 | 0 |
| GRID | 45 | 0 | 0.70000 | 0.00000 | 5.00E-2 | 0 |
| GRID | 46 | 0 | 0.70000 | 0.00000 | -5.0E-2 | 0 |
| GRID | 47 | 0 | 0.80000 | 0.00000 | 5.00E-2 | 0 |
| GRID | 48 | 0 | 0.80000 | 0.00000 | -5.0E-2 | 0 |
| GRID | 49 | 0 | 0.90000 | 0.00000 | 5.00E-2 | 0 |
| GRID | 50 | 0 | 0.90000 | 0.00000 | -5.0E-2 | 0 |
| GRID | 51 | 0 | 1.00000 | 0.00000 | 5.00E-2 | 0 |
| GRID | 52 | 0 | 1.00000 | 0.00000 | -5.0E-2 | 0 |
| GRID | 53 | 0 | 1.10000 | 0.00000 | 5.00E-2 | 0 |
| GRID | 54 | 0 | 1.10000 | 0.00000 | -5.0E-2 | 0 |
| GRID | 55 | 0 | 1.20000 | 0.00000 | 5.00E-2 | 0 |
| GRID | 56 | 0 | 1.20000 | 0.00000 | -5.0E-2 | 0 |
| GRID | 57 | 0 | 1.30000 | 0.00000 | 5.00E-2 | 0 |
| GRID | 58 | 0 | 1.30000 | 0.00000 | -5.0E-2 | 0 |
| GRID | 59 | 0 | 1.40000 | 0.00000 | 5.00E-2 | 0 |
| GRID | 60 | 0 | 1.40000 | 0.00000 | -5.0E-2 | 0 |
| GRID | 61 | 0 | 1.50000 | 0.00000 | 5.00E-2 | 0 |
| GRID | 62 | 0 | 1.50000 | 0.00000 | -5.0E-2 | 0 |
| CQUAD4 | 1 | 1 | 1 | 2 | 4 | 3 0.00000 |
| CQUAD4 | 2 | 1 | 3 | 4 | 6 | 5 0.00000 |
| CQUAD4 | 3 | 1 | 5 | 6 | 8 | 7 0.00000 |
| CQUAD4 | 4 | 1 | 7 | 8 | 10 | 9 0.00000 |
| CQUAD4 | 5 | 1 | 9 | 10 | 12 | 11 0.00000 |
| CQUAD4 | 6 | 1 | 11 | 12 | 14 | 13 0.00000 |
| CQUAD4 | 7 | 1 | 13 | 14 | 16 | 15 0.00000 |
| CQUAD4 | 8 | 1 | 15 | 16 | 18 | 17 0.00000 |
| CQUAD4 | 9 | 1 | 17 | 18 | 20 | 19 0.00000 |
| CQUAD4 | 10 | 1 | 19 | 20 | 22 | 21 0.00000 |
| CQUAD4 | 11 | 1 | 21 | 22 | 24 | 23 0.00000 |
| CQUAD4 | 12 | 1 | 23 | 24 | 26 | 25 0.00000 |
| CQUAD4 | 13 | 1 | 25 | 26 | 28 | 27 0.00000 |
| CQUAD4 | 14 | 1 | 27 | 28 | 30 | 29 0.00000 |
| CQUAD4 | 15 | 1 | 29 | 30 | 32 | 31 0.00000 |
| CQUAD4 | 16 | 1 | 31 | 32 | 34 | 33 0.00000 |
| CQUAD4 | 17 | 1 | 33 | 34 | 36 | 35 0.00000 |
| CQUAD4 | 18 | 1 | 35 | 36 | 38 | 37 0.00000 |
| CQUAD4 | 19 | 1 | 37 | 38 | 40 | 39 000000 |
| CQUAD4 | 20 | 1 | 39 | 40 | 42 | 41 0.00000 |
| CQUAD4 | 21 | 1 | 41 | 42 | 44 | 43 0.00000 |
| CQUAD4 | 22 | 1 | 43 | 44 | 46 | 45 0.00000 |
| CQUAD4 | 23 | 1 | 45 | 46 | 48 | 47 0.00000 |
| CQUAD4 | 24 | 1 | 47 | 48 | 50 | 49 0.00000 |
| CQUAD4 | 25 | 1 | 49 | 50 | 52 | 51 0.00000 |
| CQUAD4 | 26 | 1 | 51 | 52 | 54 | 53 0.00000 |
| CQUAD4 | 27 | 1 | 53 | 54 | 56 | 55 0.00000 |
| CQUAD4 | 28 | 1 | 55 | 56 | 58 | 57 0.00000 |
| CQUAD4 | 29 | 1 | 57 | 58 | 60 | 59 0.00000 |
| CQUAD4 | 30 | 1 | 59 | 60 | 62 | 61 0.00000 |
| MAT1 | 1117.2E+6 | | | 0.34000 8.94E-6 | | |
| $MAT1 | 1275.8E+6 | | | 0.25000 3.6E-6 | | |
| PSHELL | 1 | 1 | 0.006 | 1 | 1 | 3.33E-10 |
| SPC1 | 1 | 123456 | 1THRU | 2 | | |
| SPC1 | 1 | 123456 | 61THRU | 62 | | |
| EIGR | 1 | GIV | | 2 | | |
| RLOAD2 | 2 | 101 | | 102 | | |

NASTRAN Input Deck:
Finite Element Model to Calculate MOMB Frequency Response

| | | | | | | |
|---|---|---|---|---|---|---|
| FREQ1 | 3 | 0.0 | 1.0 | 6500 | | |
| TABDMP1 | | 4 | CRIT | | | +XX |
| +XX | 0.0 | 0.01 | 6500.0 | 0.01 | ENDT | |
| DAREA | 101 | 3 | 2-6.19E-5 | | | |
| DAREA | 101 | 4 | 2-6.19E-5 | | | |
| DAREA | 101 | 5 | 2-6.19E-5 | | | |
| DAREA | 101 | 6 | 2-6.19E-5 | | | |
| DAREA | 101 | 7 | 2-6.19E-5 | | | |
| DAREA | 101 | 8 | 2-6.19E-5 | | | |
| DAREA | 101 | 9 | 2-6.19E-5 | | | |
| DAREA | 101 | 10 | 2-6.19E-5 | | | |
| DAREA | 101 | 11 | 2-6.19E-5 | | | |
| DAREA | 101 | 12 | 2-6.19E-5 | | | |
| DAREA | 101 | 13 | 2-6.19E-5 | | | |
| DAREA | 101 | 14 | 2-6.19E-5 | | | |
| DAREA | 101 | 15 | 2-6.19E-5 | | | |
| DAREA | 101 | 16 | 2-6.19E-5 | | | |
| DAREA | 101 | 17 | 2-6.19E-5 | | | |
| DAREA | 101 | 18 | 2-6.19E-5 | | | |
| DAREA | 101 | 19 | 2-6.19E-5 | | | |
| DAREA | 101 | 20 | 2-6.19E-5 | | | |
| DAREA | 101 | 21 | 2-6.19E-5 | | | |
| DAREA | 101 | 22 | 2-6.19E-5 | | | |
| DAREA | 101 | 23 | 2-6.19E-5 | | | |
| DAREA | 101 | 24 | 2-6.19E-5 | | | |
| DAREA | 101 | 25 | 2-6.19E-5 | | | |
| DAREA | 101 | 26 | 2-6.19E-5 | | | |
| DAREA | 101 | 27 | 2-6.19E-5 | | | |
| DAREA | 101 | 28 | 2-6.19E-5 | | | |
| DAREA | 101 | 29 | 2-6.19E-5 | | | |
| DAREA | 101 | 30 | 2-6.19E-5 | | | |
| DAREA | 101 | 31 | 2-6.19E-5 | | | |
| DAREA | 101 | 32 | 2-6.19E-5 | | | |
| DAREA | 101 | 33 | 2-6.19E-5 | | | |
| DAREA | 101 | 34 | 2-6.19E-5 | | | |
| DAREA | 101 | 35 | 2-6.19E-5 | | | |
| DAREA | 101 | 36 | 2-6.19E-5 | | | |
| DAREA | 101 | 37 | 2-6.19E-5 | | | |
| DAREA | 101 | 38 | 2-6.19E-5 | | | |
| DAREA | 101 | 39 | 2-6.19E-5 | | | |
| DAREA | 101 | 40 | 2-6.19E-5 | | | |
| DAREA | 101 | 41 | 2-6.19E-5 | | | |
| DAREA | 101 | 42 | 2-6.19E-5 | | | |
| DAREA | 101 | 43 | 2-6.19E-5 | | | |
| DAREA | 101 | 44 | 2-6.19E-5 | | | |
| DAREA | 101 | 45 | 2-6.19E-5 | | | |
| DAREA | 101 | 46 | 2-6.19E-5 | | | |
| DAREA | 101 | 47 | 2-6.19E-5 | | | |
| DAREA | 101 | 48 | 2-6.19E-5 | | | |
| DAREA | 101 | 49 | 2-6.19E-5 | | | |
| DAREA | 101 | 50 | 2-6.19E-5 | | | |
| DAREA | 101 | 51 | 2-6.19E-5 | | | |
| DAREA | 101 | 52 | 2-6.19E-5 | | | |
| DAREA | 101 | 53 | 2-6.19E-5 | | | |
| DAREA | 101 | 54 | 2-6.19E-5 | | | |
| DAREA | 101 | 55 | 2-6.19E-5 | | | |
| DAREA | 101 | 56 | 2-6.19E-5 | | | |
| DAREA | 101 | 57 | 2-6.19E-5 | | | |
| DAREA | 101 | 58 | 2-6.19E-5 | | | |
| DAREA | 101 | 59 | 2-6.19E-5 | | | |
| DAREA | 101 | 60 | 2-6.19E-5 | | | |
| GRAV | 1 | 9.81E+3 | 0.0 | 1.0 | 0.0 | |
| TABLED1 | 102 | | | | | +TAB1 |
| +TAB1 | 0.0 | 1.0 | 6500.0 | 1.0 | ENDT | |
| PARAM | AUTOSPC | YES | | | | |
| PARAM | PRGPST | NO | | | | |
| PARAM | POST | -2 | | | | |
| ENDDATA | | | | | | |

I claim:

1. A method for manufacturing a micromechanical oscillating mass sensor, said sensor including a first conducting layer, a second conducting layer and a dielectric layer, comprising the steps of:
   (a) drilling a hole through a flat nonconductive substrate, said hole having a predetermined diameter;
   (b) activating a surface of the substrate to make it adhesive;
   (c) applying a first thin conductive layer of a metal foil over the adhesive substrate surface such that said layer covers said hole;
   (d) micromachining the first thin conductive layer of metal foil to form said first conducting layer of the sensing element;
   (e) applying a dielectric substrate of a nonconductive oxide over the micromachined first thin conducting layer;
   (f) machining the dielectric substrate to form said dielectric layer of the sensing element;
   (g) applying a second thin conductive layer of a metal foil over the dielectric layer;
   (h) machining the second thin conductive layer of metal foil to form said second conducting layer of the sensing element.

2. The method of claim 1, wherein the substrate surface is activated (step (b)) using a nonreactive atomic beam to increase the surface energy of the substrate.

3. The method of claim 2, wherein the predetermined hole diameter of step (a) is substantially equal to the desired length of the sensing element.

4. The method of claim 3, wherein the step of machining of the first thin conductive layer (step (d)) is performed photolithographically.

5. The method of claim 4, wherein the step of machining of the dielectric layer (step (f)) is performed photolithographically.

6. The method of claim 5, wherein the step of machining of the second thin conductive layer (step (h)) is performed photolithographically.

* * * * *